(12) United States Patent
Park

(10) Patent No.: US 9,280,017 B2
(45) Date of Patent: Mar. 8, 2016

(54) LIQUID CRYSTAL DISPLAY DEVICE AND METHOD FOR MANUFACTURING THE SAME

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventor: Kuhyun Park, Beijing (CN)

(73) Assignees: BOE Technology Group Co., Ltd., Beijing (CN); Hefei BOE Optoelectronics Technology Co., Ltd., Hefei, Anhui (CN)

( * ) Notice: Subject to any disclaimer, the term of this patent is extended or adjusted under 35 U.S.C. 154(b) by 0 days.

(21) Appl. No.: 14/093,361

(22) Filed: Nov. 29, 2013

(65) Prior Publication Data
US 2014/0146276 A1    May 29, 2014

(30) Foreign Application Priority Data
Nov. 29, 2012 (CN) .......................... 2012 1 0502007

(51) Int. Cl.
*G02F 1/1335* (2006.01)
*G02F 1/13363* (2006.01)
*G02F 1/1343* (2006.01)

(52) U.S. Cl.
CPC .... *G02F 1/133634* (2013.01); *G02F 1/134363* (2013.01); *G02F 1/133528* (2013.01);
(Continued)

(58) Field of Classification Search
CPC ................................................ G02F 1/133528
USPC ........................................................... 349/96
See application file for complete search history.

(56) References Cited

U.S. PATENT DOCUMENTS 6,822,713 B1 * 11/2004 Yaroshchuk et al. .......... 349/117
2001/0030726 A1 * 10/2001 Yoshida et al. ............... 349/117
(Continued)

FOREIGN PATENT DOCUMENTS

CN    1379252 A    11/2002
CN    1487339 A    4/2004
(Continued)

OTHER PUBLICATIONS

First Office Action for corresponding Chinese Patent Application No. 201210502007.4, 22 pages (including English translation), (Sep. 23, 2014).
(Continued)

*Primary Examiner* — Thanh-Nhan P Nguyen
(74) *Attorney, Agent, or Firm* — Blakely, Sokoloff, Taylor & Zafman LLP

(57) ABSTRACT

Embodiments of the present invention provide a liquid crystal display device and a producing method thereof, and relate to the field of liquid crystal display. The liquid crystal display device of the present invention comprises a liquid crystal panel and a first optical compensation structure and a second optical compensation structure located at two sides of the liquid crystal panel, and the second optical compensation structure comprises: a polarizing film layer, a compensation film layer and a biaxial film layer, wherein, the polarizing film layer is located between the compensation film layer and the biaxial film layer; and the biaxial film layer is located between the polarizing film layer and the liquid crystal panel. Through providing the biaxial film layer in the second optical compensation structure, the present invention can effectively correct the color shift generated in the diagonal direction of the liquid crystal panel and improve the product quality.

9 Claims, 3 Drawing Sheets

(52) U.S. Cl.
CPC . *G02F2001/134372* (2013.01); *G02F 2413/04* (2013.01); *G02F 2413/12* (2013.01); *Y10T 29/49904* (2015.01)

(56) References Cited

U.S. PATENT DOCUMENTS

| | | | |
|---|---|---|---|
| 2002/0145804 A1 | 10/2002 | Yano et al. | |
| 2003/0156235 A1* | 8/2003 | Kuzuhara et al. | 349/96 |
| 2003/0169390 A1 | 9/2003 | Miyachi | |
| 2005/0128411 A1 | 6/2005 | Nagai et al. | |
| 2009/0268133 A1 | 10/2009 | Yoshimi et al. | |
| 2010/0253884 A1* | 10/2010 | Katou et al. | 349/96 |
| 2013/0321746 A1* | 12/2013 | Kim et al. | 349/96 |

FOREIGN PATENT DOCUMENTS

| | | |
|---|---|---|
| CN | 1627154 A | 6/2005 |
| CN | 1920598 A | 2/2007 |
| CN | 101361020 A | 2/2009 |
| JP | 2004131637 A | 4/2004 |
| JP | 2007334308 A | 12/2007 |
| JP | 2009036860 A | 2/2009 |
| KR | 20090070053 A | 7/2009 |

OTHER PUBLICATIONS

European Patent Office Communication enclosing Extended European Search Report for corresponding European Patent Application No. 13194568.5, 10 pages, (Mar. 25, 2014).
First Office Action for corresponding Korean Patent Application No. 10-2013-0146157, 10 pages (including English translation), (Nov. 25, 2014).
Second Office Action for corresponding Chinese Patent Application No. 201210502007.4, 18 pages (including English translation), (Apr. 28, 2015).
European Patent Office Communication Pursuant to Article 94(3) EPC enclosing First Office Action for corresponding European Patent Application No. 13194568.5, 4 pages, (May 12, 2015).
Decision of Rejection for corresponding Korean Patent Application No. 10-2013-0146157, 4 pages, (May 26, 2015).
Final Rejection for corresponding Korean Patent Application No. 10-2013-0146157, 3 pages, (Jul. 20, 2015).

* cited by examiner

LIQUID CRYSTAL DISPLAY DEVICE AND METHOD FOR MANUFACTURING THE SAME

FIELD OF THE INVENTION

The present invention relates to the technical field of liquid crystal display, and especially to a liquid crystal display device and a method for manufacturing the same.

BACKGROUND OF THE INVENTION

With the continuous development of LCD (Liquid Crystal Display) display technologies, people have continuously increasing demands on the quality of the LCD. An IPS (In-Plane Switching) type LCD with a higher contrast and wider visible view angle has been more and more popular with people.

Being different from a TN (Twisted Nematic) type liquid crystal display, the liquid crystal of the IPS type liquid crystal display is applied with a horizontal electric field, and then the liquid crystal molecules can conduct twisted movement within a plane parallel to a substrate. The twisting of the liquid crystal molecules will change the travelling direction of light. In order to increase the contrast of the liquid crystal display, the current IPS type liquid crystal display needs to dispose equivalent polarizers at two sides of a liquid crystal panel. The structure of the IPS type liquid crystal display in the prior art is shown in FIG. 1, and the liquid crystal display comprises an upper optical compensation structure 11 having a polarizing function, a liquid crystal panel 12 and a lower optical compensation structure 13 arranged opposite to the upper optical compensation structure 11. The upper optical compensation structure 11 further comprises a first TAC layer 111 and a second TAC layer 113 having a polarizing effect and an optical compensation function, and a first PVA layer 112 as a polarizing film layer which is located between the first TAC layer 111 and the second TAC layer 113, a third TAC layer 131, a second PVA layer 132 and a fourth TAC layer 133 contained in the lower optical compensation structure 13 correspond to the second TAC layer 113, the first PVA layer 112 and the first TAC layer 111 of the upper optical compensation structure 11, respectively, and the hierarchical structure relationship among the respective layers is shown in FIG. 1. The IPS type liquid crystal display with this structure has a disadvantage that color shift may occur in the diagonal direction of the liquid crystal panel. Taking the IPS type liquid crystal display shown in FIG. 1 as an example, the Δnd of the current liquid crystal panel 12 is usually 392.7 nm, the horizontal phase differences Re of the second TAC layer 113 and the third TAC layer 131 are both 3 nm, and their thickness direction phase differences Rth are both 40 nm, and thus generated color shift in the diagonal direction is shown in FIG. 2. The prior art cannot solve the problem of color shift generated in the diagonal direction of the liquid crystal panel.

SUMMARY OF THE INVENTION

Embodiments of the present invention provide a liquid crystal display device and a producing method thereof, which can correct the color shift generated in the diagonal direction of the liquid crystal panel.

To achieve the above object, the embodiments of the present invention use the following technical solutions:

According to one aspect of the present invention, a liquid crystal display device comprises a liquid crystal panel, and a first optical compensation structure and a second optical compensation structure located at two sides of the liquid crystal panel respectively, the second optical compensation structure comprises: a polarizing film layer, a compensation film layer and a biaxial film layer, wherein, the polarizing film layer is located between the compensation film layer and the biaxial film layer; and the biaxial film layer is located between the polarizing film layer and the liquid crystal panel.

The first optical compensation structure comprises a first compensation film layer, a second compensation film layer and a first polarizing film layer located between the first compensation film layer and the second compensation film layer, and the second compensation film layer is located between the first polarizing film layer and the liquid crystal panel.

According to another aspect of the present invention, a method for manufacturing a liquid crystal display device comprises:

forming a first polarizing film layer between a first compensation film layer and a second compensation film layer arranged opposite to each other, to obtain a first optical compensation structure;

forming a polarizing film layer between a compensation film layer and a biaxial film layer arranged opposite to each other, to obtain a second optical compensation structure; and disposing the first optical compensation structure and the second optical compensation structure at two sides of a liquid crystal panel, respectively, so that the biaxial film layer is located between the polarizing film layer and the liquid crystal panel.

The method further comprises arranging the first optical compensation structure such that the second compensation film layer is located between the first polarizing film layer and the liquid crystal panel.

For the liquid crystal display device and the method for manufacturing the same according to the embodiments of the present invention, the liquid crystal panel is located between the first optical compensation structure and the second optical compensation structure arranged opposite to each other, the first optical compensation structure comprises two layers of compensation film layers and a polarizing film layer between the two layers of compensation film layers, the second optical compensation structure comprises a biaxial film layer and a compensation film layer, and the polarizing film layer is located between the biaxial film layer and the compensation film layer. The liquid crystal display device using this structure can, through providing the biaxial film layer in the optical compensation structure, effectively correct the color shift generated in the diagonal direction of the liquid crystal panel and improve the product quality.

BRIEF DESCRIPTION OF THE DRAWINGS

To more clearly describe the embodiments of the present invention and the technical solutions in the prior art, the embodiments and the drawings that are used in describing the prior art will be briefed hereinafter. Obviously, the drawings described hereinafter are only embodiments of the present invention, and one skilled in the art can obtain other drawings from such drawings without ingenuity work.

DETAILED DESCRIPTION OF THE EMBODIMENTS

The technical solutions in the embodiments of the present invention will be described clearly and thoroughly hereinafter in combination with the drawings of the embodiments of the present invention. Obviously, the embodiments described herein are only a part, rather than all, of the embodiments of the present invention. All the other embodiments obtained by skilled persons in the art in light of the embodiments of the present invention drop within the protective scope of the present invention.

Figure 1:
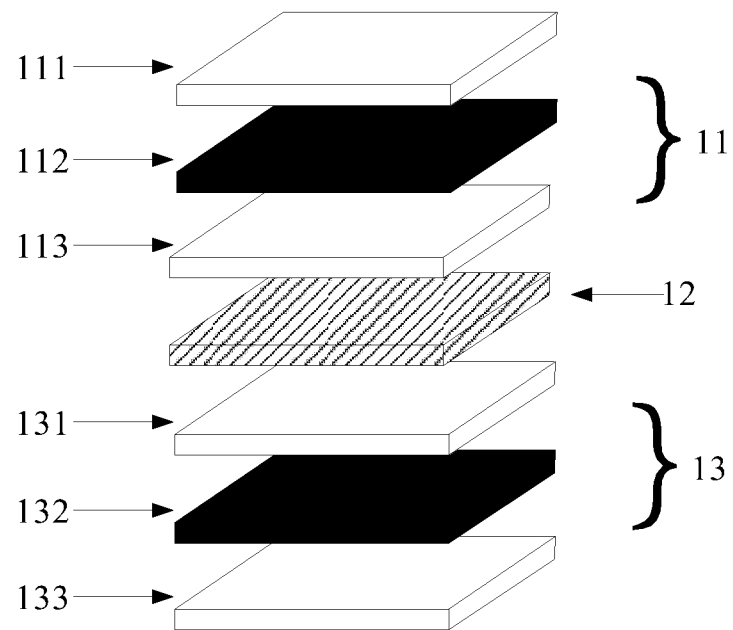
FIG. 1 is a schematic structural view of an existing IPS type liquid crystal display.
Figure 2:
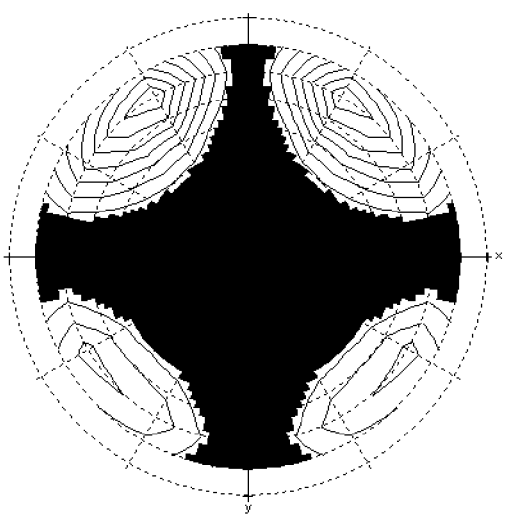
FIG. 2 is a schematic diagram of the simulation effect of the color shift of the existing IPS type liquid crystal display.
Figure 3:
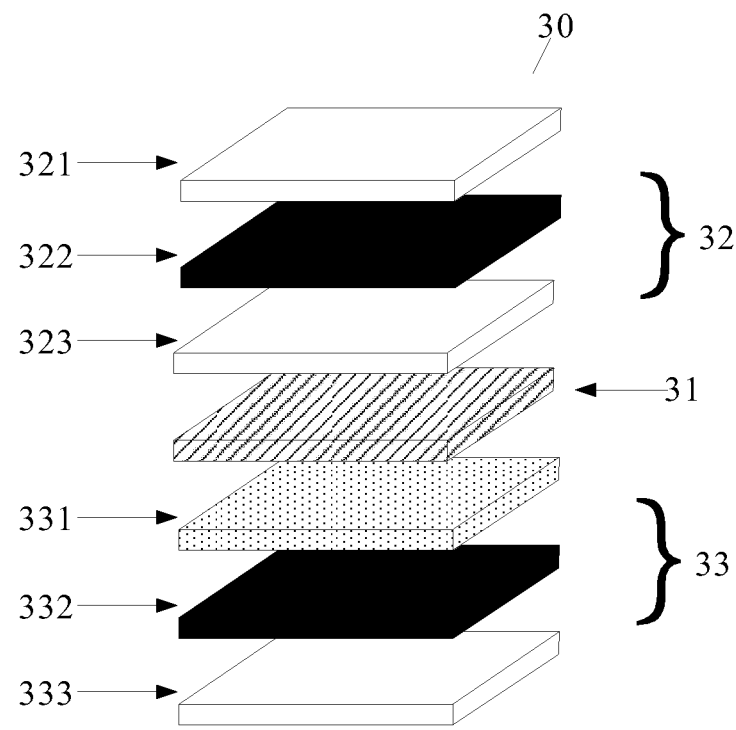
FIG. 3 is a schematic structural view of a liquid crystal display device according to the embodiment of the present invention.

As shown in FIG. 3, the liquid crystal display device 30 according to the embodiment of the present invention comprises: a liquid crystal panel 31 and a first optical compensation structure 32 and a second optical compensation structure 33 located at two sides of the liquid crystal panel 31. The first optical compensation structure 32 comprises a first compensation film layer 321, a second compensation film layer 323 and a first polarizing film layer 322 located between the first compensation film layer 321 and the second compensation film layer 323, and the second compensation film layer 323 is located between the first polarizing film layer 322 and the liquid crystal panel 31. The second optical compensation structure 33 comprises: a second polarizing film layer 332, a third compensation film layer 333 and a biaxial film layer 331, and the second polarizing film layer 332 is located between the third compensation film layer 333 and the biaxial film layer 331. The biaxial film layer 331 is located between the second polarizing film layer 332 and the liquid crystal panel 31.

In the liquid crystal display device according to the embodiment of the present invention, the liquid crystal panel is located between the first optical compensation structure and the second optical compensation structure opposite to each other, wherein, the first optical compensation structure comprises the first compensation film layer, the second compensation film layer and the first polarizing film layer between the first compensation film layer and the second compensation film layer, the second optical compensation structure comprises a biaxial film layer and the third compensation film layer, and the second polarizing film layer is located between the biaxial film layer and the third compensation film layer. The liquid crystal display device using this structure can, through providing the biaxial film layer in the second optical compensation structure, effectively correct the color shift generated in the diagonal direction of the liquid crystal panel, and improve the product quality.

The structural relationship between the film layers of the first optical compensation structure and that of the second optical compensation structure is shown in FIG. 3. In the second optical compensation structure of the liquid crystal display device of the present invention, the biaxial film layer and the third compensation film layer are used to replace the double-compensation film layer structure in the liquid crystal display device in the prior art, wherein, the biaxial film layer refers to a transparent film layer having double optical axes, and birefraction will occur when light passes through the biaxial film layer.

Wherein, the in-plane direction phase difference Re of the biaxial film layer 331 may ranges from 200 nm to 300 nm, and the thickness direction phase difference Rth of the biaxial film layer 331 may ranges from 100 nm to 150 nm.

It needs to be indicated that, in the embodiments of the present invention, the in-plane direction phase difference Re refers to a phase delay value in the film plane, and the thickness direction phase difference Rth refers to a phase delay value in a direction perpendicular to the film plane. Specifically, $Re=(nx-ny)\times d$, $Rth=[(nx+ny)/2-nz]\times d$, wherein, nx is the refractive index along a slow axis in the film plane, ny is the refractive index along a fast axis in the film plane, nz is the refractive index along the film depth, and d is the film thickness with nm as unit. During manufacturing the biaxial film layer, the material for manufacturing the biaxial film layer may be selected according to the above standards.

Correspondingly, the in-plane direction phase difference Re' of the second compensation film layer 323 of the first optical compensation structure 32 opposite to the biaxial film layer 331 may range from 0 nm to 4 nm, and the thickness direction phase difference Rth' of the second compensation film layer 323 may range from 0 nm to 10 nm.

For example, during practical use, the in-plane direction phase difference Re of the biaxial film layer 331 can be 274 nm, and the thickness direction phase difference Rth of the biaxial film layer 331 can be 138 nm. Correspondingly, the in-plane direction phase difference Re' and the thickness direction phase difference Rth' of the second compensation film layer 323 may be both 0 nm.

Figure 4:
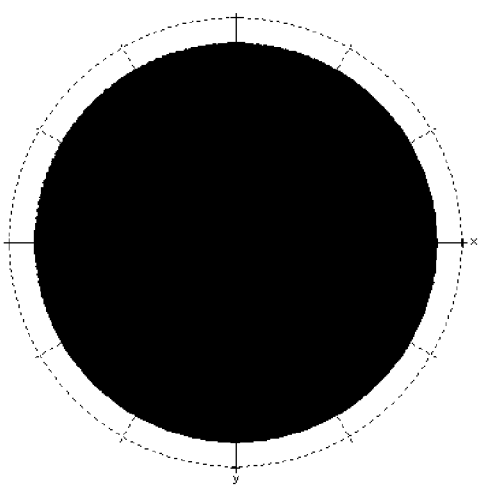
FIG. 4 is a schematic diagram of the simulation effect of the color shift of the liquid crystal display device according to the embodiment of the present invention.

The color shift generated by the liquid crystal display device according to the embodiments of the present invention is shown in FIG. 4, and it can be seen that the color shift in the diagonal direction is improved greatly.

Furthermore, at least one of the first polarizing film layer 322 and the second polarizing film layer 332 is a polyvinyl alcohol PVA thin film, and at least one of the first compensation film layer 321, the second compensation film layer 323 and the third compensation film layer 333 is a cellulose triacetate TAC thin film.

Such a layered structure as the polarizing film layer and the compensation film layer according to the embodiments of the present invention can be widely used in liquid crystal display devices of an AD-SDS (Advanced-Super Dimensional Switching, short for ADS) type, an IPS (In Plane Switch) type, a TN (Twist Nematic) type and the like. The AD-SDS technology forms a multidimensional electric field through the electric field generated at the edge of a slit electrode in the same plane and the inter-layer electric field generated between the slit electrode and a plate-shaped electrode, then the slit electrodes in a liquid crystal box and all orientation liquid crystal molecules directly above the electrodes may generate rotational conversion, and the working efficiency of the liquid crystal is improved and light transmittance is increased.

It should be understood that the specific form of the first optical compensation structure 32 disclosed above is just one embodiment of the present invention, and the first optical compensation structure 32 is not limited to this and can comprise any structure that can achieve the polarizing function to compensate the traveling direction of the light.

Any of the above liquid crystal display devices comprises a color filter substrate and an array substrate assembled together. The difference is that the common electrode of the TN type display device is disposed on the color filter substrate and the pixel electrode thereof is disposed on the array substrate; and the common electrodes and the pixel electrodes of the ADS type display device and the IFS type display device are all disposed on the array substrate.

In the array substrate of the ADS type display device, the common electrode and the pixel electrode may be disposed at different layers, wherein, the electrode on the upper layer comprises a plurality of strip-shaped electrodes (which can be deemed as slit electrodes), and the electrode on the lower layer comprises a plurality of strip-shaped or may be a flat plate electrode. The disposing at different layers is conducted with respect to at least two patterns, which means forming at least two patterns from at least two layers of thin films through patterning process. Disposing at different layers for two patterns refers to forming two patterns respectively from two layers of thin films through patterning process. For example, disposing the common electrode and the pixel electrode at different layers refers to forming the lower layer electrode from a first layer of transparent conductive thin film through the patterning process and forming the upper layer electrode from a second layer of transparent conductive thin film through the patterning process, the lower layer electrode is the common electrode (or the pixel electrode), and the upper layer electrode is the pixel electrode (or the common electrode).

In the array substrate of the IPS type display device, the common electrode and the pixel electrode are disposed at the same layer, the common electrode comprises a plurality of first strip-shaped electrodes, the pixel electrode comprises a plurality of second strip-shaped electrodes, and the first strip-shaped electrodes and the second strip-shaped electrodes are placed with intervals. The disposing at the same layer is conducted with respect to at least two patterns, which means forming at least two patterns from a same thin film through a patterning process. For example, disposing the common electrode and the pixel electrode on the same layer refers to forming the common electrode and the pixel electrode from the same transparent conductive thin film through the patterning process. Wherein, the pixel electrode refers to the electrode electrically connected with a data line electrode through a switch unit (which, for example, can be a thin film transistor), and the common electrode refers to an electrode electrically connected with a common electrode line.

The liquid crystal display device using this structure can, through providing the biaxial film layer in the second optical compensation structure, effectively correct the color shift generated in the diagonal direction of the liquid crystal panel and improve the product quality.

Figure 5:
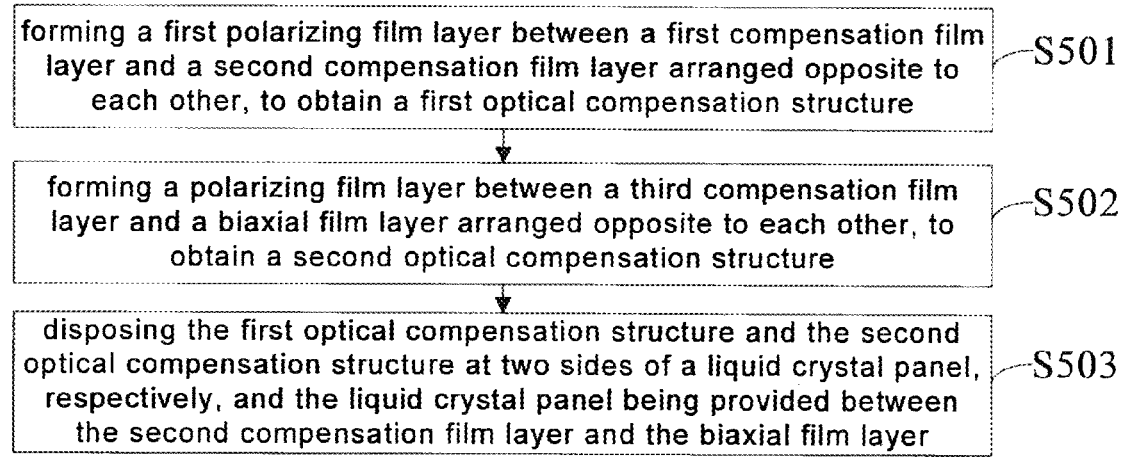
FIG. 5 is a flow chart of the method for manufacturing the liquid crystal display device according to the embodiment of the present invention.

As shown in FIG. 5, the method for manufacturing the liquid crystal display device according to the embodiment of the present invention comprises:

S501, forming a first polarizing film layer between a first compensation film layer and a second compensation film layer arranged opposite to each other, to obtain a first optical compensation structure;

S502, forming a polarizing film layer between a third compensation film layer and a biaxial film layer arranged opposite to each other, to obtain a second optical compensation structure; and the in-plane direction phase difference Re of the biaxial film layer may range from 200 nm to 300 nm, and the thickness direction phase difference Rth of the biaxial film layer may range from 100 nm to 150 nm.

Correspondingly, the in-plane direction phase difference Re' of the second compensation film layer of the first optical compensation structure opposite to the biaxial film layer may range from 0 nm to 4 nm, and the thickness direction phase difference Rth' of the second compensation film layer may range from 0 nm to 10 nm.

For example, during actual use, the in-plane direction phase difference Re of the biaxial film layer may be 274 nm, and the thickness direction phase difference Rth of the biaxial film layer may be 138 nm. Correspondingly, the in-plane direction phase difference Re' and the thickness direction phase difference Rth' of the second compensation film layer may be both 0 nm.

It needs to be indicated that, in the embodiments of the present invention, the in-plane direction phase difference Re refers to a phase retardation value in the film plane, and the thickness direction phase difference Rth refers to a phase retardation value in a direction perpendicular to the film plane. Specifically, $Re=(nx-ny)\times d$, $Rth=[(nx+ny)/2-nz]\times d$, wherein, nx is the refractive index along a slow axis in the film plane, ny is the refractive index along a fast axis in the film plane, nz is the refractive index along the film depth, and d is the film thickness with nm as unit. During manufacturing the biaxial film layer, the material for manufacturing the biaxial film layer may be selected according to above standards.

S503, disposing the first optical compensation structure and the second optical compensation structure at two sides of a liquid crystal panel, respectively, and the liquid crystal panel is located between the second compensation film layer and the biaxial film layer.

In the embodiments of the present invention, at least one of the first polarizing film layer and the second polarizing film layer is a polyvinyl alcohol PVA thin film, and at least one of the first compensation film layer, the second compensation film layer and the third compensation film layer is a cellulose triacetate TAC thin film.

For the method for manufacturing the liquid crystal display device according to the embodiments of the present invention, the liquid crystal panel is located between the first optical compensation structure and the second optical compensation structure arranged opposite to each other, wherein, the first optical compensation structure comprises two layers of compensation film layers and a polarizing film layer between the two layers of compensation film layers, the second optical compensation structure comprises a biaxial film layer and a third compensation film layer, and the second polarizing film layer is located between the biaxial film layer and the third compensation film layer. The liquid crystal display device using this structure can, by providing the biaxial film layer in the optical compensation structure, effectively correct the color shift generated in the diagonal direction of the liquid crystal panel and improve the product quality.

Described above are just specific embodiments of the present invention, while the scope of protection of the present invention is not limited to this, any person skilled in this field can easily conceive changes and substitutions within the technical scope disclosed by the present invention, which shall be covered in the scope of protection of the present invention, thus, the scope of protection of the present invention shall be defined by the scope of protection of the claims.

What is claimed is:

1. A liquid crystal display device, comprising: a liquid crystal panel and a first optical compensation structure and a second optical compensation structure located at two sides of the liquid crystal panel respectively, the first optical compensation structure comprises a first compensation film layer, a second compensation film layer and a first polarizing film layer located between the first compensation film layer and the second compensation film layer, wherein, the second optical compensation structure comprises: a polarizing film layer, a compensation film layer and a biaxial film layer, wherein, the polarizing film layer is located between the compensation film layer and the biaxial film layer;

the biaxial film layer is located between the polarizing film layer and the liquid crystal panel;

wherein the second compensation film layer is located between the first polarizing film layer and the liquid crystal panel and wherein the in-plane direction phase difference of the second compensation film layer and the thickness direction phase difference of the second compensation film layer are both 0 nm.

2. The liquid crystal display device according to claim 1, wherein, at least one of the first polarizing film layer and the polarizing film layer is a polyvinyl alcohol thin film; and at least one of the first compensation film layer, the second compensation film layer and the compensation film layer is a cellulose triacetate thin film.

3. The liquid crystal display device according to claim 1, wherein, the in-plane direction phase difference of the biaxial film layer is within the ranges from 200 nm to 300 nm; and the thickness direction phase difference of the biaxial film layer is within the ranges from 100 nm to 150 nm.

4. The liquid crystal display device according to claim 3, wherein, the in-plane direction phase difference of the biaxial film layer is 274 nm, and the thickness direction phase difference of the biaxial film layer is 138 nm.

5. The liquid crystal display device according to claim 1, wherein, the in-plane direction phase difference of the biaxial film layer is 274 nm, and the thickness direction phase difference of the biaxial film layer is 138 nm.

6. A method for manufacturing a liquid crystal display device, comprising:

forming a first polarizing film layer between a first compensation film layer and a second compensation film layer arranged opposite to each other, to obtain a first optical compensation structure;

forming a polarizing film layer between a compensation film layer and a biaxial film layer arranged opposite to each other, to obtain a second optical compensation structure; and disposing the first optical compensation structure and the second optical compensation structure at two sides of a liquid crystal panel respectively, so that the biaxial film layer is located between the polarizing film layer and the liquid crystal panel, wherein the first optical compensation structure is disposed so that the second compensation film layer is located between the first polarizing film layer and the liquid crystal panel, and wherein the in-plane direction phase difference of the second compensation film layer and the thickness direction phase difference of the second compensation film layer are both 0 nm.

7. The method according to claim 6, wherein, the in-plane direction phase difference of the biaxial film layer is within the ranges from 200 nm to 300 nm; and the thickness direction phase difference of the biaxial film layer is within the ranges from 100 nm to 150 nm.

8. The method according to claim 7, wherein, the in-plane direction phase difference of the biaxial film layer is 274 nm, and the thickness direction phase difference of the biaxial film layer is 138 nm.

9. The method according to claim 6, wherein, at least one of the first polarizing film layer and the polarizing film layer is a polyvinyl alcohol thin film; and at least one of the first compensation film layer, the second compensation film layer and the compensation film layer is a cellulose triacetate thin film.

* * * * *